United States Patent
Stumpp et al.

(10) Patent No.: US 7,277,786 B2
(45) Date of Patent: Oct. 2, 2007

(54) CHASSIS-SUPPORTED SECONDARY BRAKING SYSTEM OR EMERGENCY BRAKING SYSTEM

(75) Inventors: Hans-Peter Stumpp, Markgroeningen (DE); Ansgar Traechtler, Ditzingen-Hirschlanden (DE); Sylvia Futterer, Ludwigsburg (DE); Willi Nagel, Remseck/Hochdorf (DE); Armin Verhagen, Schwieberdingen (DE); Klaus-Michael Mayer, Ditzingen (DE); Peter Dominke, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 10/977,953

(22) Filed: Oct. 29, 2004

(65) Prior Publication Data

US 2005/0125132 A1 Jun. 9, 2005

(30) Foreign Application Priority Data

Oct. 29, 2003 (DE) ............................... 103 50 552

(51) Int. Cl.
*G06F 7/70* (2006.01)
(52) U.S. Cl. ........................................ 701/70
(58) Field of Classification Search .................. 701/70
See application file for complete search history.

(56) References Cited

U.S. PATENT DOCUMENTS

| 4,018,052 A | | 4/1977 | Laussermair |
| 5,112,114 A | * | 5/1992 | Cogswell et al. ........ 303/113.2 |
| 6,606,859 B1 | * | 8/2003 | Mackiewicz et al. ...... 60/547.1 |

FOREIGN PATENT DOCUMENTS

| DE | 35 14 375 | 10/1986 |
| DE | 37 34 489 | 4/1989 |
| FR | 2418343 | 9/1979 |

* cited by examiner

*Primary Examiner*—Thu V. Nguyen
(74) *Attorney, Agent, or Firm*—Kenyon & Kenyon LLP

(57) ABSTRACT

A method for controlling a braking system of a vehicle is described, in which the braking system has at least a first control unit for controlling a first braking force on at least one wheel brake of a wheel of the vehicle, and an accumulator for receiving a pressurized medium, the method including generating the first braking force by at least one of a first hydraulic component and a first pneumatic component, filling the accumulator with the medium independently of the at least one of the first hydraulic component and the first pneumatic components via a relative movement between at least one wheel and a vehicle body, and generating a second braking force at predefinable times on the at least one wheel brake as a function of the filling of the accumulator.

10 Claims, 4 Drawing Sheets

CHASSIS-SUPPORTED SECONDARY BRAKING SYSTEM OR EMERGENCY BRAKING SYSTEM

FIELD OF THE INVENTION

The present invention is directed to a method and a device for controlling a braking system of a vehicle in which two braking forces may be set on at least one wheel brake of one wheel.

BACKGROUND INFORMATION

An emergency braking system for trucks is known from German Published Patent Application No. 37 34 489 in which a supplementary servo braking device is independent of the normal braking device of the front wheels and the rear wheels and which is effective until the vehicle has come to a standstill or is at least slowed down to a controllable driving state. The power for controlling the supplementary servo braking device is obtained from a part of the truck which necessarily rotates when the truck is in motion. The supplementary servo braking device has a chargeable power accumulator (pressure holding device) for this purpose. Pressure charging of the pressure accumulator takes place in a moving truck via a necessarily rotating part of the truck. For example, the input shaft or the output shaft of the universal joints or the drive shaft are intended for this purpose. The supplementary servo braking device is intended as an emergency braking system which is actuated by operating the emergency switching device in the driver's cab. Independently of the emergency switching device operatable by the driver, the emergency braking system may be actuated automatically if the analysis of the rotational speed signal of one axle indicates that the normal servo braking device is malfunctioning.

SUMMARY OF THE INVENTION

The present invention describes a method and a device which, during control of a pneumatic and/or hydraulic or electromechanical braking system of a vehicle, make it possible in a defined manner to implement a second braking force on at least one wheel brake of one wheel in addition to the defined setting of a first braking force. The first braking force is generated by a first control unit using first hydraulic and/or pneumatic components. In contrast, the second braking force is generated at predefinable times as a function of the filling of an accumulator with a pressurized medium. According to the present invention, the accumulator is a device separated from the first hydraulic and/or pneumatic components which is preferably mounted in the proximity of the wheel brakes and which is filled via a relative movement between at least one wheel and the vehicle body. It is therefore conceivable that, with the aid of a working cylinder attached to a wheel, the accumulator is filled with volume by utilizing the relative movement between wheel and body.

The first braking force is advantageously generated using first hydraulic components. The hydraulic component may be a hydraulic modulator and/or a pump. In addition, the second braking force is generated as a function of the pressure of the medium stored in the accumulator and/or of the first braking force. Furthermore, the first and the second braking force form the resulting braking force on the at least one wheel brake. However, the first and the second braking force may also be generated on the wheel brake independently of one another. This may be used, for example, to optionally generate only the first or the second braking force on the wheel brake.

In an embodiment of the present invention, the accumulator is filled independently of the actuation of the first control unit and/or depending on the actuation of a second control unit. The second control unit may be equipped with a special emergency feature which is operated only when the first control unit malfunctions. Gases or fluids may be used as media for filling the accumulator and for generating the second braking force. Air or hydraulic fluid is advantageously used in the vehicle for filling the accumulator. The first and the second braking force may be generated using different operating media.

A particular refinement of the present invention is implemented in that the vehicle has at least one wheel having at least two wheel brakes. Here, the first braking force is generated by the first control unit actuating, for example, a first wheel brake, and/or the second braking force is generated as a function of the pressurized medium in the accumulator and a second control unit and/or the first wheel brake. It is particularly advantageous if the second braking force is generated on a second wheel brake. The second braking force is generated on the second wheel brake independently from the first control unit and/or as a function of a driver's intent and/or as a function of predefinable times.

The second braking force is advantageously triggered or generated at certain predefinable times. This may be, for example, a supporting braking effect in a parking brake, and/or during emergency braking, and/or during driving off on inclined road surfaces (hill holder), and/or when a boost in the first braking force is requested by the driver and/or by a braking effect system. In order not to completely use up the pressurized medium in the accumulator, a boost request of the first braking force is only provided to a limited extent.

If the first and second braking force are generated using different operating media, a separating element is advantageously necessary when only one wheel brake is used for generating the first and second braking forces.

A further advantage of the embodiment according to the present invention lies in the fact that the hydraulic or pneumatic systems may have a more compact design.

The reaction times on the wheel brakes may be shortened if the pressure accumulators are positioned close to the wheels. In contrast, a long feed line, as can be found, for example, in conventional braking systems having a central pressure accumulator, produces longer pressure build-up times on the wheel brakes. Furthermore, a quicker braking force build-up may be achieved in general.

An emergency brake function may be implemented in an electromechanical braking system by using the accumulator filled independently of the braking system. This is particularly important in the event of a malfunction of the entire electrical system, since none of the electromechanical brake actuators applies a braking force. Direct emergency braking may be initiated from the accumulator in this case. To make the accumulator content available in a controlled manner via the brake pedal presents a further possibility. In the case of the braking support via the accumulator, rapid braking procedures, capable of applying a braking force prior to the pressure build-up in the hydraulic circuit, are possible in hydraulic braking systems. Support by the brake assistant is also conceivable. In the area of active and passive safety, it is desirable, in particular in the event of automatic emergency braking, to achieve a rapid braking force build-up. This is likewise achieved by using the accumulator.

Finally, braking comfort responses are conceivable in which, for example, an automatic wheel brake or a device preventing the roll-back while driving off on a hillside (hill holder) are powered by the pressure accumulator, or existing active hydraulic systems may have a more compact design due to the additional chassis pressure accumulator.

A method and a device which, when a pneumatic and/or hydraulic or electromechanical braking system of a vehicle is controlled, make it possible to set a second braking force on at least one wheel brake of one wheel in a defined manner in addition to the defined setting of a first braking force. The first braking force is generated by a first control unit using first hydraulic and/or pneumatic components, whereas the second braking force is generated at predefinable times as a function of the filling of an accumulator with a pressurized medium. The accumulator is a device separated from the first hydraulic and/or pneumatic components which is preferably mounted in the proximity of the wheel brakes and which is filled via a relative movement between at least one wheel and the vehicle body. It is therefore conceivable that, with the aid of a working cylinder attached to a wheel, the accumulator is filled with volume of a medium by utilizing the relative movement between wheel and body.

DETAILED DESCRIPTION

Figure 1:
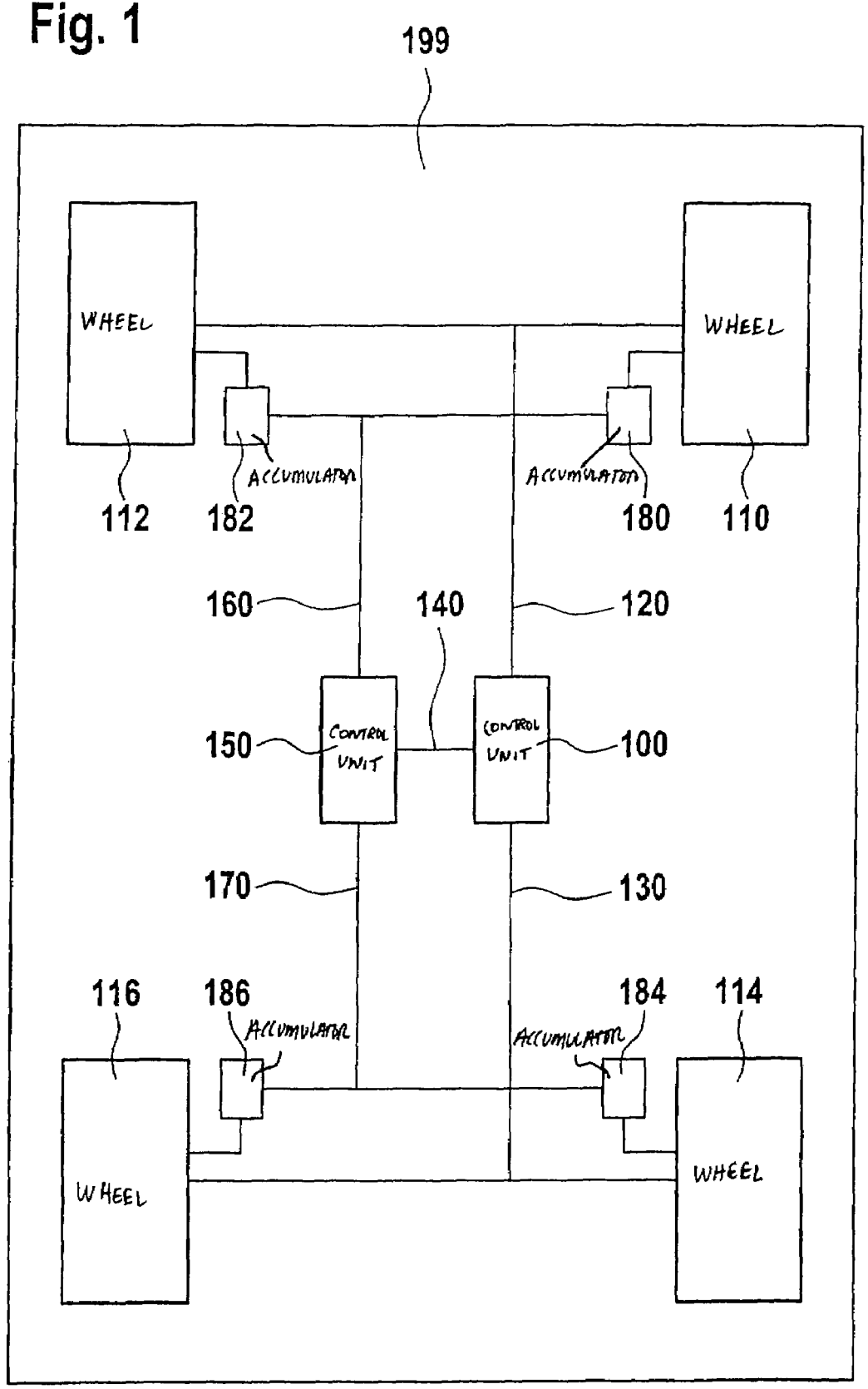
FIG. 1 shows a schematic representation of a vehicle including a braking system.

FIG. 1 schematically shows a vehicle 199 which is equipped with an electric, hydraulic, and/or pneumatic braking system according to the present invention. The braking system has a first braking circuit including a first control unit 100, the control unit being able to set a first braking force on at least one wheel of the vehicle. For clarifying the present invention, vehicle 199 is shown in the present exemplary embodiment as having four wheels, each wheel 110, 112, 114, and 116 having a first wheel brake. Moreover, first control unit 100 may individually actuate each of the four first wheel brakes on the four wheels 110, 112, 114, and 116. In addition, numbers 180, 182, 184, and 186 indicate four accumulators in vehicle 199 which contain a pressurized medium. Air, as well as hydraulic fluids, may be used as media. Using a second control unit 150, which controls a second braking circuit, a second braking force is settable on wheels 110, 112, 114, and 116 which takes place as a function of the pressurized medium in the accumulator on the particular wheel brakes. For the sake of simplicity, one accumulator 180, 182, 184, and 186 is assigned to each of the wheels in the present exemplary embodiment; a second braking force on wheels 110, 112, 114, and 116 may be generated as a function of the pressurized medium in the particular accumulator. It is possible, similarly to first control unit 100, to individually decelerate the wheels using the second braking force. Wheels 110, 112, 114, and 116 are decelerated by the second braking force optionally via the first wheel brake or via a second wheel brake which is additionally attached to the respective wheel.

If the first and the second braking force are applied to the wheel via the first wheel brake, then two cases are to be differentiated. In the first case, the same wheel brake is used for both braking forces, but different actuators. This procedure has the advantage that the two actuators, one of which generates the first braking force and the other generates the second braking force, may be operated using different media. If, for example, the first actuator is operated using hydraulic fluid and the accumulator is filled with air, then both actuators may be operated separately from one another. However, if, in the second case, the first wheel brake is operated using only one actuator, then several problems arise which must be dealt with.

It is generally an advantage if the accumulator has its own media reservoir so that a sufficiently high pressure may be built up by the second braking force independently of the media requirements of a hydraulic and/or a pneumatic braking system. Moreover, for example, no media exchange may take place between the first and the second braking force generation, and thus no loss in volume [of one medium] occurs at the expense of the other. The separation of the media creates the necessity to install suitable actuators which are able to operate with a pressurized medium simultaneously and/or successively; furthermore, it is necessary to effectively separate the two media without them intermixing. However, there is the possibility of using two different media for actuating the actuator and thus setting a deceleration of the wheel. If, for example, air instead of hydraulic fluid is used for filling the accumulator, the source of error of a pressure loss due to leaking hydraulic fluid may be circumvented if the ambient air is used.

In addition to equipping each wheel with its own accumulator, a central accumulator for all wheels or at least one accumulator for one axle, one vehicle side, or one vehicle diagonal may be provided in a further exemplary embodiment. In these cases also, second control unit 150 may achieve an individual deceleration of individual wheels 110, 112, 114, and 116 via a suitable actuation.

A connection between first control unit 100 and second control unit 150 is indicated by line 140. A coordination of the two different braking force generations may take place via this line, in boosting the first braking force using the second braking force, for example. According to the present invention, accumulators 180, 182, 184, and 186 are filled independently of a hydraulic modulator or a pump. In fact, the accumulator is filled with the medium using a working cylinder attached to the wheel suspension by utilizing the relative movement between wheel and body in such a way that a pressure is created in the accumulator. Due to the great forces acting on the chassis, pressures of up to 100 bar may be generated with no problem. The accumulator is preferably filled via a media reservoir which is separated from the rest of the braking system. This makes it possible to generate pressure in the accumulator and to supply the second braking force independently of the instantaneous media requirement in the braking system.

Figure 2:
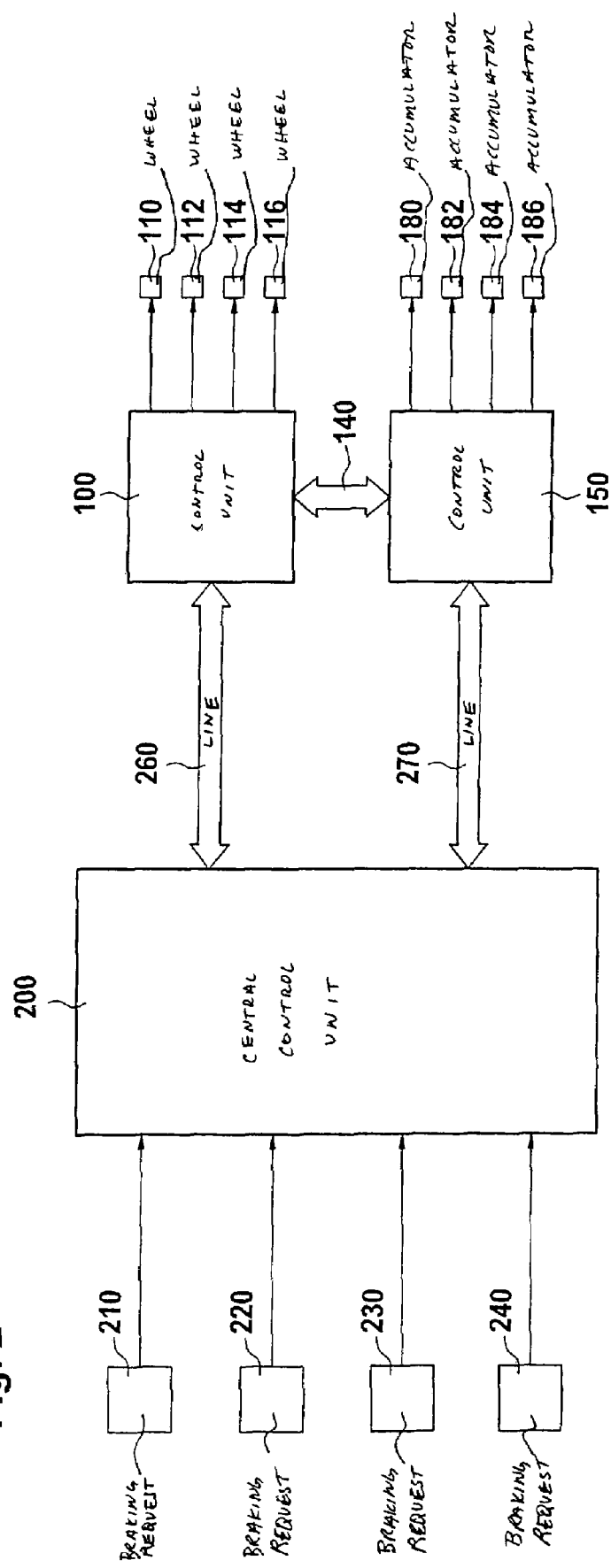
FIG. 2 shows a block diagram which illustrates the linkage of the two braking circuits with the input signals and the wheel brakes.

FIG. 2 shows an exemplary embodiment of how the first control unit and the second control unit act on the wheel brakes thus contributing to the deceleration of the vehicle. The braking requests of driver 210, of the automatic braking systems such as ABS, ESP, ASC 220, as well as a request for emergency braking 230 are detected in a central control unit 200. Emergency braking 230 may take place as a function of predefined plausibility queries in the vehicle, or due to comparisons with values of operational dynamics. Furthermore, different braking comfort functions 240 may be detected in central control unit 200. Support of the parking brake or of a hill holder (driving off uphill) is conceivable here.

In addition to braking requests 210 through 240, the operating data of the wheel brakes is also input in central control unit 200 for control of the wheel brakes. It may be determined in this way whether one of the two wheel brakes is completely ready for operation, or whether one of the two wheel brakes is not available for a braking force build-up. A query or actuation of the first wheel brake is executed via line 260 to first control unit 100, whereas a corresponding query or actuation of the second wheel brake takes place via line 270 to second control unit 150. The function of central control unit 200 may also be divided between the two control units 100 and 150, connection 140 between the two control units then assuming an important role. An exchange between the two control units 100 and 150 may generally take place via this connection 140, thereby taking into account the functional readiness and operating readiness of the two wheel brakes during actuation.

While the first control unit controls the first braking force on the first wheel brakes of wheels 110 through 116, the second control unit, which controls the second wheel brakes 180 through 186, is provided for generating the second braking force.

In a further exemplary embodiment, a first braking circuit is assigned to the first wheel brakes on the wheels, and a second braking circuit is assigned to the second wheel brakes. Here control unit 100 controls the first braking circuit and control unit 150 controls the second braking circuit. Coordination 140 between the two control units allows effective use of the first and the second wheel brakes on the wheels.

For an emergency operation, i.e., for the event that the power supply in an electromechanical braking system, for example, malfunctions and control unit 100 is thus no longer fully functional, control unit 150 may be provided with a separate power supply. This separate power supply, for example, may be implemented by using a capacitor which has enough power to initiate and control an emergency braking. This separate power supply may also be connected in the event of a malfunction of the main power supply which also powers control unit 100.

Figure 3:
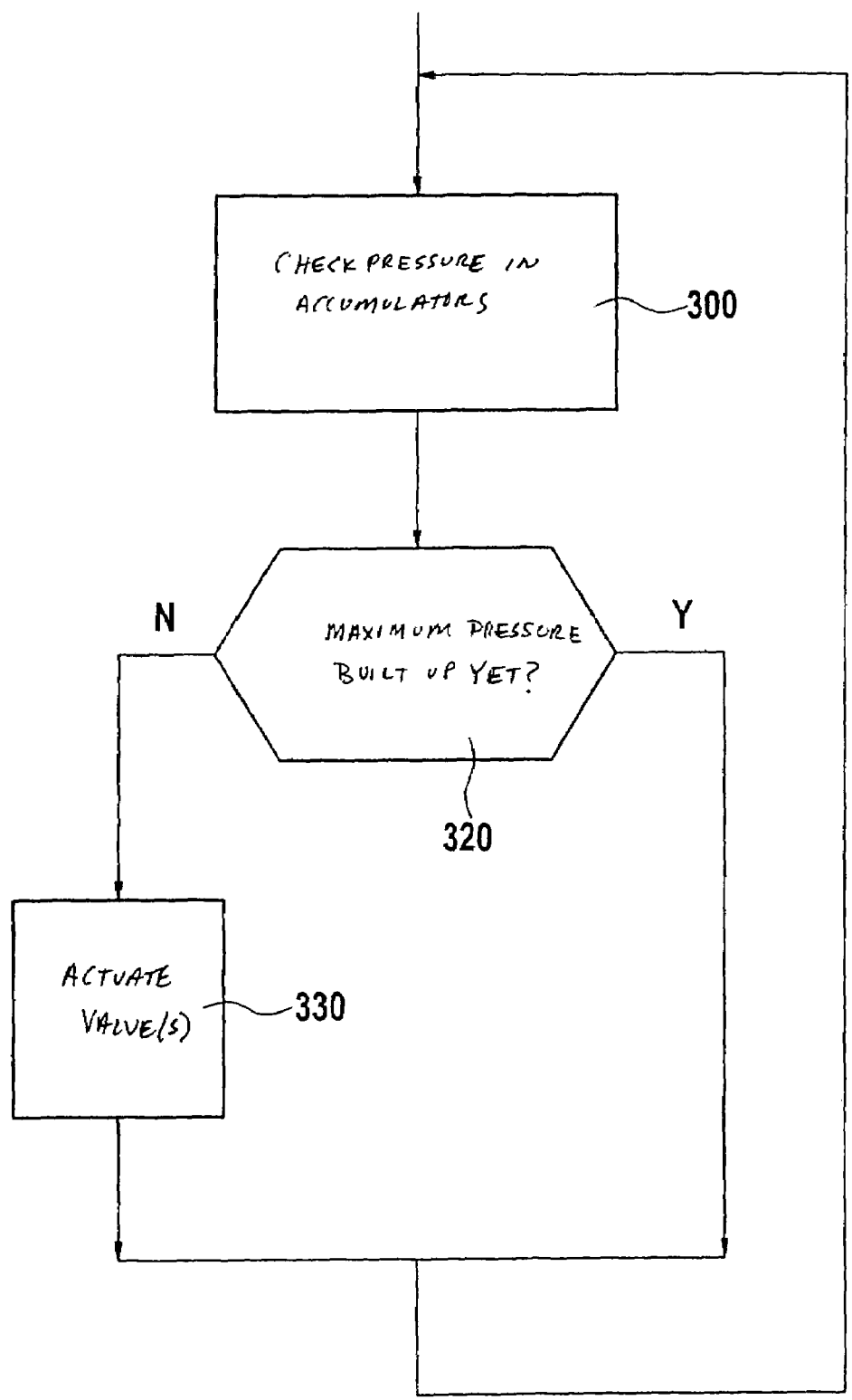
FIG. 3 shows control of the filling of the accumulator in a flow chart.

FIG. 3 shows an algorithm which controls filling of accumulators 180, 182, 184, and 186 in second control unit 150. After the start of the algorithm, the pressures in accumulators 180, 182, 184, and 186 are checked in step 300. It is determined here which accumulators may continue to be filled. It is also determined in step 300 to what extent the movement of the vehicle enables further filling of the accumulators. If, due to a comparison with stored values, it is determined in step 320 that in one or several of accumulators 180, 182, 184, and 186 the maximum pressure has not yet been built up, valves are correspondingly actuated in step 330 by a working cylinder attached to the wheel suspension, making further filling of the accumulators possible. Filling takes place preferably from a separate media reservoir or from the surroundings when air is used as an operating medium. If it is determined in step 320 that a further pressure build-up is unnecessary, then the algorithm is terminated.

Figure 4:
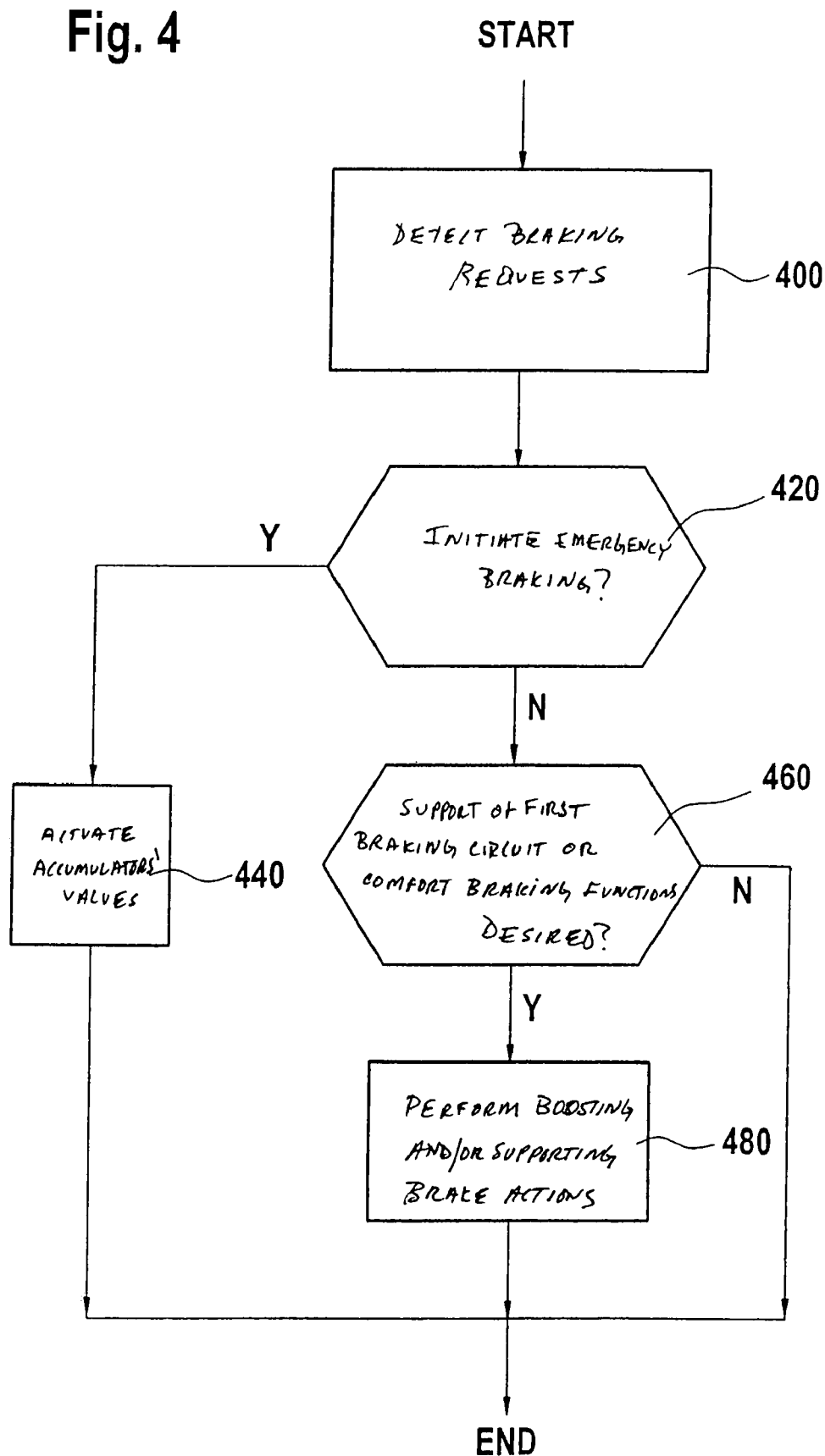
FIG. 4 shows control of the discharge of the accumulator.

The control of accumulators 180, 182, 184, and 186 via second control unit 150 is schematically illustrated by the flow chart in FIG. 4. After the start of the algorithm, the braking requests of driver 210, of the automatic braking systems such as ABS, ESP, ACC, and ASC 220 and also the braking requests for supporting braking comfort functions 240 are detected in step 400. The function of first control unit 100 and the first braking circuit, as well as the pressure in accumulators 180, 182, 184, and 186 are additionally queried for further control. Following these queries, it may be determined to what extent the second braking circuit may support or, in the case of emergency, may substitute the first braking circuit. It is checked in step 420 whether emergency braking should be initiated. An external system 230 is optionally queried for this purpose, which initiates emergency braking or which triggers independent initiation of emergency braking based on plausibility considerations. This may generally occur, for example, when the first braking circuit is faulty, resulting in the first braking circuit no longer being able to decelerate the wheels. This may occur, for example, when the first braking circuit has insufficient hydraulic fluid or air, when the first control unit is defective, when the power supply fails, or the like.

However, to initiate emergency braking by the second braking circuit it is necessary that accumulators 180 through 186 have sufficient pressure. If only some accumulators are sufficiently filled for emergency braking, then appropriate distribution of the actuation or distribution of the deceleration to the different wheels is necessary, so that the vehicle does not become unpredictable for the driver, because only the right side is braked, for example. This may be implemented, for example, in that the wheel brakes are only actuated in a pulsed manner using the pressurized medium in the accumulators. In addition, to prevent locking, the second control unit may be provided with an ABS regulation to prevent unnecessary locking. If it is determined in step 420 that emergency braking may be executed, then the valves which distribute the pressure from accumulators 180 through 186 to the wheel brakes on the wheels are actuated in step 440. This may occur in an electromechanical braking system, for example, in such a way that the accumulator is connected via a valve to a supplementary pressure cylinder on the brake caliper of the electromechanical brake, thereby making it possible to press the brake pads against the disc. However, if emergency braking is to occur, then it is checked in step 460 whether a booster function, i.e., support of the first braking circuit, should take place. It is additionally checked whether certain comfort braking functions should be activated.

If it is determined in step 460 that support of the first braking circuit or certain comfort braking functions are desired, then the algorithm is further run in step 480; otherwise the algorithm is terminated. A supporting brake action when driving off on inclined roadways, which regularly result in unintentional rolling back of the vehicle, may be implemented in step 480. However, the parking brake may additionally be automatically actuated, or the braking function of the parking brake may be supported by the second braking circuit. In a particular exemplary embodiment, the supporting effect of the second braking circuit makes a more compact design of the present hydraulic and/or pneumatic systems possible. In addition, boosting the braking force of the first braking circuit is also possible. In such a booster function, the accumulators in hydraulic braking systems, for example, may add the second braking force to the first braking force via a switch-over valve or a proportional valve. This may take place individually on each wheel, but also simultaneously on several wheels, or centrally at the main brake cylinder. Based on the knowledge of the respective system dynamics, a pre-control portion is supplied from the accumulator until the system is able to provide the necessary brake pressure. In addition to shortening the reaction times, the accumulator may also be used to temporarily increase the braking pressure during braking. The volume or the pressure provided in the accumulator, or the braking force may also be adapted to the particular application. In all the boosting or supporting actuations of the second braking circuit in step 480 it must be ensured that sufficient pressure is retained in accumulators 180 through 186 to implement emergency braking. Because of this reason, the supporting braking effect via the accumulators may only be utilized up to a minimum value of the pressure.

Furthermore, it is conceivable to make the accumulator content available in a controlled manner via the brake pedal so that the driver is able to exercise direct control of the second braking force by operating the brake pedal.

In distributing the braking forces to the front axle and the rear axle, when using a central accumulator for the wheel brakes on the front axle and the rear axle, distribution of the braking force may be selected in a further exemplary embodiment in such a way that the larger portion of the braking force acts on the front wheel brakes.

What is claimed is:

1. A method for controlling a braking system of a vehicle, the braking system having at least a first control unit for controlling a first braking force on at least one wheel brake of a wheel of the vehicle, and an accumulator for receiving a pressurized medium, the method comprising:
    generating the first braking force by at least one of a first hydraulic component and a first pneumatic component;
    filling the accumulator with the medium independently of the at least one of the first hydraulic component and the first pneumatic components via a relative movement between at least one wheel and a vehicle body; and
    generating a second braking force at predefinable times on the at least one wheel brake as a function of the filling of the accumulator.

2. The method as recited in claim 1, wherein:
    the first braking force is generated by at least one of:
        a hydraulic modulator, and
        a pump,
    the second braking force is generated as a function of at least one of:
        a pressure of the medium stored in the accumulator, and
        a pressure of the medium stored in the accumulator and the first braking force,
    the first braking force and the second braking force at least one of:
        form the resulting braking force on the at least one wheel brake, and
        are capable of being generated independently of one another on the at least one wheel brake, solely one of the first braking force and the second braking force in particular being generated on the at least one wheel brake.

3. The method as recited in claim 1, wherein:
    the accumulator is filled at least one of:
        independently of an actuation of the first control unit,
        as a function of an actuation of a second control unit, and
        using one of a gas medium including air and a liquid medium including hydraulic fluid, and
    the first braking force and the second braking force use different operating media.

4. The method as recited in claim 1, wherein:
    the vehicle includes at least one wheel having at least two wheel brakes,
    the first braking force is generated by actuating a first wheel brake,
    the second braking force is generated as a function of the pressurized medium and at least one of a second control unit and the first wheel brake, and
    on a second wheel brake, the second control unit generates the second braking force via a regulation of a pressure from the accumulator onto the second wheel brake of the at least one wheel at least one of:
        independently of the first control unit,
        as a function of a driver's intent, and
        as a function of predefinable times.

5. The method as recited in claim 1, wherein a recognition of at least one of:
    an engagement of a parking brake,
    a generation of a supporting braking force when driving off on inclined road surfaces,
    an emergency braking,
    a boost request including a brief boost request, for the first braking force by at least one of the driver and a brake regulation system are provided as predefinable times.

6. A device for controlling a braking system of a vehicle, the braking system having at least a first control unit for controlling a first braking force on at least one wheel brake of a wheel of the vehicle and an accumulator for receiving a pressurized medium, the device comprising:
    an arrangement for generating the first braking force by at least one of a first hydraulic component and a first pneumatic component;
    an arrangement for filling the accumulator with the medium independently of the at least one of the first hydraulic component and the first pneumatic components via a relative movement between at least one wheel and a vehicle body; and
    an arrangement for generating a second braking force at predefinable times on the at least one wheel brake as a function of the filling of the accumulator.

7. The device as recited in claim 6, wherein:
    the first braking force is generated by at least one of:
        a hydraulic modulator, and
        a pump,
    the second braking force is generated as a function of at least one of:
        a pressure of the medium stored in the accumulator, and
        a pressure of the medium stored in the accumulator and the first braking force,
    the first braking force and the second braking force at least one of:
        form the resulting braking force on the at least one wheel brake, and
        are capable of being generated independently of one another on the at least one wheel brake, solely one of the first braking force and the second braking force in particular being generated on the at least one wheel brake.

8. The device as recited in claim 6, wherein:
    the accumulator is filled at least one of:
        independently of an actuation of the first control unit,
        as a function of an actuation of a second control unit, and
        using one of a gas medium including air and a liquid medium including hydraulic fluid, and
    the first braking force and the second braking force use different operating media.

9. The device as recited in claim 6, wherein:
    the vehicle includes at least one wheel having at least two wheel brakes, the first braking force is generated by actuating a first wheel brake, the second braking force is generated as a function of the pressurized medium and at least one of a second control unit and the first wheel brake, and on a second wheel brake, the second control unit generates the second braking force via a regulation of a pressure from the accumulator onto the second wheel brake of the at least one wheel at least one of:

independently of the first control unit, as a function of a driver's intent, and as a function of predefinable times.

10. The device as recited in claim 6, wherein a recognition of at least one of:

an engagement of a parking brake, a generation of a supporting braking force when driving off on inclined road surfaces, an emergency braking, a boost request including a brief boost request, for the first braking force by at least one of the driver and a brake regulation system are provided as predefinable times.

* * * * *